3,250,770
SYNTHESIS OF 1:4-DIAZINES
Paul Schmidt, Therwil, Kurt Eichenberger, Basel, Alberto Rossi, Oberwil, Basel-Land, and Max Wilhelm, Basel, Switzerland, assignors to Ciba Corporation, New York, N.Y., a corporation of Delaware
No Drawing. Filed Dec. 11, 1962, Ser. No. 243,731
Claims priority, application Switzerland, Dec. 14, 1961, 14,511/61; June 22, 1962, 7,533/62; Sept. 7, 1962, 10,629/62
30 Claims. (Cl. 260—247.5)

The present invention relates to new 1:4-diazines and a process for the manufacture of 1:4-diazines.

More especially the present invention concerns a new process for the manufacture of 1:4-diazine compounds that contain an amino group in the 3-position, a fused ring in the 5:6-position and are unsubstituted in the 2-position or contain in that position a hydroxyl group or an oxo group or an unsubstituted or substituted hydrocarbon group and, if they contain an oxo group in the 2-position, may be substituted in the 1-position by the organic radical of an alcohol, and of their salts.

According to the present process a compound of the formula

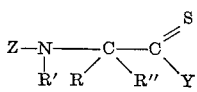

in which Z represents a ring containing in ortho-position a group A which is capable of being converted into a free amino group in the absence of acidic or basic condensing agents; R represents a hydrogen atom or a hydroxyl group or an unsubstituted or substituted hydrocarbon group and R' and R" together represent a second bond, or R' represents the organic radical of an alcohol and R' and R" together represents an oxo group, and in which Y represents an amino group, is reacted in the absence of an acidic or basic condensing agent so as to convert the group A into a free amino group and the diazine ring is formed in the absence of an acidic or basic condensing agent.

In the starting materials used in the present process Z represents, for example, an alicyclic group such as a cycloalkyl (for example a cyclopentyl, cyclohexyl or cycloheptyl) group, or an aromatic group, preferably an at most binuclear (such as a naphthyl or more esepecially a phenyl) group, or a heterocyclic group which is bound to the nitrogen atom through a cyclic carbon atom in vicinal position to a further cyclic carbon atom, being, for example, a pyrimidyl-4 or -5, pyridyl-2 or -3, pyrazolyl-3 or -4 or pyridazyl-3 or -4 group.

The symbol R preferably represents a hydrogen atom or a hydroxyl group. As unsubstituted or substituted hydrocarbon groups there are suitable above all unsubstituted or substituted lower aliphatic, cycloaliphatic, cycloaliphatic-aliphatic, aromatic or aromatic-aliphatic hydrocarbon groups such as corresponding alkyl, alkenyl, cycloalkyl, cycloalkenyl, cycloalky-alkyl, cycloalkenyl-alkyl, aryl, aralkyl or aralkenyl groups. As subtituents of these groups there may be mentioned, for example: For aliphatic groups, hydroxyl, alkoxy, halogen (such as chlorine or bromine), amino, alkylamino or dialkylamino; or cycloaliphatic groups, alkyl, and for aromatic groups, hydroxyl, alkoxy, alkylenedioxy, alkyl, halogen, trifluoromethyl, nitro, amino or dialkyl-amino. As alkyl groups in the above-mentioned groups there come into consideration more especially methyl or ethyl, or straight or branched propyl, butyl, pentyl or hexyl groups which may be bound in any desired position; particularly suitable alkenyl groups are allyl; particularly suitable cyclo-alkyl groups are cyclopentyl, cyclohexyl or cyloheptyl; particularly suitable cycloalkenyl groups are cyclopentenyl or cyclohexenyl; especially suitable aryl groups are phenyl groups and as aralkyl or aralkenyl groups there may be especially mentioned benzyl, α-phenylethyl, β-phenylethyl or phenyl-vinyl groups.

The above-mentioned organic radical of an alcohol is, for example, an unsubstituted or substituted hydrocarbon group, such as has been defined above for R. Alternatively it may be a heterocyclic radical, such as a pyridyl, quinolyl or thienyl group.

The amino group in the thioamide grouping may be unsubstituted, but it is preferably monosubstituted or disubstituted. Suitable substituents are, for example, the unsubstituted or substituted hydrocarbon groups, especially lower ones, mentioned above for R, more especially alkyl groups, or alkylene groups in which the alkylene chain may be interrupted by hetero atoms, such as oxaalkylene or azalkylene groups, for example butylene-(1:4), pentylene-(1:5), hexylene-(1:5), hexylene-(1:6), heptylene-(2:6), 3-oxa- or 3-aza-pentylene-(1:5), 3-methyl-, 3-ethyl- or 3-hydroxyethyl-3-aza-pentylene-(1:5), 3-aza-hexylene-(1:6) or 4-methyl-4-aza-heptylene-(2:6).

A part from the group A the cyclic group Z may contain further substituents; if it is alicyclic, it may further contain, for example, alkyl groups, such as those mentioned above. If it is aromatic or heterocyclic, there are suitable, for example, the substituents mentioned above for phenyl groups. For pyrimidyl groups there may be mentioned above all amino, hydroxyl or mercapto groups so that Z may be, for example, a 2:6-diamino-pyrimidyl-4 group that contains in the 5-position the group A capable of being converted into an amino group.

The group A, which is convertible into a free amino group in the absence of acidic or basic condensing agents, is, for example, a group convertible into an amino group by reduction, for example, a nitro nitroso or azo group. Also suitable is a group that can be converted into an amino group by reaction with ammonia, for example an activated halogen atom such as occurs, for example, in the 4-position of a pyrimidine ring, or in the 3-position of a pyridazine ring, or in ortho- and/or para-position to one or two nitro groups in an aromatic ring.

Particularly valuable starting materials are compounds of the formula

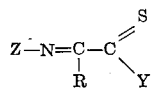

in which Y and Z have the aforesaid meanings and R represents a hydrogen atom, a hydroxyl group or an unsubstituted or substituted hydrocarbon group.

Preferred starting materials are α-[ortho-nitro-, nitroso- or azo-anilino]-α-oxoacetic acid thioamides, as well as α-(5-nitro-, nitroso- or azo-pyrimidyl-4-amino)-α-oxoacetic acid thioamides and α-(4-nitro-, nitroso- or azo-pyrazolyl-3-amino)-α-oxoacetic acid thioamides, and above all those which contain a tertiary amino group in the thioamide grouping, being, for example, a morpholino, piperidino, pyrrolidino, N-methyl-piperazino or lower dialkyl-amino group, in which the alkyl groups may be, for example, those mentioned above.

The conversion of the group A in ortho-position into the free amino group follows the usual practice. Thus, the reduction of a nitro, nitroso or azo group may be performed as required,for example, with nascent hydrogen such as is formed by the action of water or metals, or with hydrogen sulfide, sulfides or hydrosulfites, or with catalytically activated hydrogen, for example with hydrogen and palladium, platinum or nickel catalysts. The reaction with ammonia is likewise performed in a known manner.

The cyclisation is preferably performed by heating, advantageously in a neutral solvent such as an alcohol; if desired, it may be accelerated or initiated by cyclisation measures such as treatment with a sulfur-binding agent such as a metal oxide, for example mercury or lead oxide.

The cyclisation reaction may be performed after, or without, isolation of the intermediate product resulting from the first reaction stage.

The starting materials are known or can be prepared by known methods. According to a particularly favourable method of manufacturing the new starting materials a compound of the formula

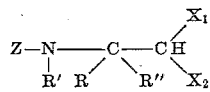

in which $X_1$ and $X_2$ each represents a free, etherified or esterified hydroxyl group, for example an alkoxy or alkanoyloxy group, or a halogen atom, or $X_1$ and $X_2$ together represent an oxo group, and Z, R, R′ and R″ have the meanings defined above, is subjected to the Kindler reaction, that is to say treated with sulfur in the presence of ammonia or of an amine.

The present invention also includes any modification of the process in which an intermediate obtainable at any stage of the process is used as starting material and any remaining step or steps is/are carried out, or the process is discontinued at any stage thereof, or a starting material is formed under the reaction conditions or is used in the form of a hydrate or salt thereof.

Some of the diazines produced by the process of the present invention, having the constitution defined above, are known; they are valuable intermediates, more especially, for the manufacture of medicaments. Compounds of this type are also useful because of their pharmacological properties, more especially their diuretic and sodium-secreting properties. They may, therefore, be administered pharmacologically to animals or suitably used as medicaments, also in veterinary medicine.

In this respect there are especially valuable the new compounds of the formulae

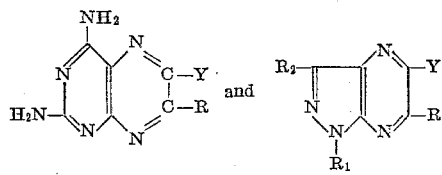

in which R and Y have the meanings given above and $R_1$ and $R_2$ each represents a hydrogen atom or an unsubstituted or substituted hydrocarbon group, for example one of those mentioned above, and their salts.

Depending on the reaction conditions and starting materials used, the final products of the process of the invention are obtained in the free form or in the form of their salts. The salts of the new compounds can be converted in a known manner into the free compounds, for example acid addition salts by reaction with a basic agent. On the other hand, when the final product is a free base, it may form salts with inorganic or organic acids. Acid addition salts are preferably manufactured with the use of therapeutically useful acids, for example hydrohalic acids such as hydrochloric or hydrobromic acid, perchloric, nitric, thiocyanic, a sulfuric or phosphoric acid; or of organic acids such as formic, acetic, propionic, glycollic, lactic, pyruvic, oxalic, malonic, succinic, maleic, fumaric, malic, tartaric, citric, ascorbic, hydroxymaleic, dihydroxymaleic, benzoic, phenylacetic, 4-aminobenzoic, 4-hydroxybenzoic, anthranilic, cinnamic, mandelic, salicylic, 4-amino-salicylic, 2-phenoxybenzoic, 2-acetoxybenzoic, embonic, methanesulfonic, ethanesulfonic, hydroxy-ethanesulfonic, benzenesulfonic, para-toluenesulfonic, naphthalenesulfonic or sulfanilic acid; or methionine, tryptophan, lysine or arginine. The resulting salts may be monosalts or polysalts. The salts may also be used for purifying the free bases.

The pharmacologically valuable new compounds are intended for use as medicaments in the form of pharmaceutical preparations containing said compounds in admixture or conjunction with solid or liquid, organic or inorganic pharmaceutical excipients suitable for enteral (for example oral) or parenteral administration. Suitable excipients are substances that do not react with the new compounds, for example: water, gelatine, lactose, starches, magnesium stearate, talcum, vegetable oils, benzyl alcohols, gums, polyalkylene glycols, cholesterol or other known medicinal excipients. The pharmaceutical preparations may be in the form of, for example, tablets, dragees or capsules, or in liquid form solutions, suspensions or emulsions. They may be sterilized and/or may contain assistanos such as preserving, stabilising, wetting or emulsifying agents, salts for regulating the osmotic pressure, or buffers. They may also contain further therapeutically useful substances.

The new compounds may also be used in veterinary medicine, for example in one of the forms mentioned above, or in animal husbandry in the form of animal feedstuffs or of additives to animal feedstuffs, using, for example, the conventional extenders and diluents or feedstuffs, respectively.

The following examples illustrate the invention.

*Example 1*

A solution of 2.95 g. of α-(ortho-nitranilino)-α-oxoacetic acid thiomorpholide in 200 cc. of ethanol was hydrogenated at room temperature in the presence of 1 g. of nickel catalyst. After 10 hours another 2 g. of nickel catalyst were added, since the liberated hydrogen sulfide inactivated the catalyst. The calculated amount of hydrogen was absorbed in the course of 20 hours. The catalyst was then suctioned off, the filtrate was evaporated to dryness under vacuum and the residue was crystallized from ethanol, to yield 2-hydroxy-3-morpholinoquinoxaline of the formula

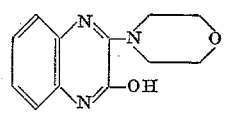

in the form of crystals melting at 204–205° C.

The starting material was prepared in the following manner:

14.8 g. of dichloroacetyl chloride were slowly added to a solution of 27.6 g. of ortho-nitraniline in 400 cc. of benzene. The mixture was stirred and heated for 3 hours at the boil, allowed to cool, suction-filtered to remove the precipitated hydrochloride, the filtrate was evaporated to dryness and the residue was crystallized from isopropyl ether, to yield ortho-dichloroacetylamino-nitrobenzene in the form of yellow crystals melting at 74 to 76° C.

5 g. of ortho-dichloroacetylamino-nitrobenzene were intimately mixed with 0.65 g. of powdered sulfur and then mixed with 30 cc. of morpholine, whereupon a reaction soon set in and the temperature rose to 65° C. To complete the reaction the batch was then heated to 100° C., allowed to cool, the precipitated morpholine hydrochloride was suctioned off, and the filtrate was evaporated to dryness under vacuum. The residue was triturated with water, whereupon it gradually solidified in crystalline form. On recrystallization from isopropyl ether, α-[ortho-nitranilino]-α-oxoacetic acid thiomorpholide of the formula

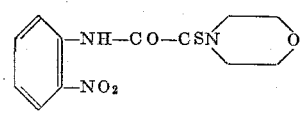

was obtained in yellow crystals melting at 136 to 137° C.

Example 2

A solution of 5 g. of α-[2-nitro-4-methyl-N-benzyl-anilino]-α-oxoacetic acid thiomorpholide in 400 cc. of absolute ethanol was hydrogenated at room temperature in the presence of 3 g. of nickel catalyst. After 17 hours another 3 g. of catalyst were added. On completion of the absorption of hydrogen the catalyst was suctioned off, the filtrate was evaporated to dryness under vacuum and the residue crystallized from ethanol+petroleum ether, to yield crystalline 1-benzyl-2-oxo-3-morpholino-6-methyl-1:2-dihydroquinoxaline of the formula

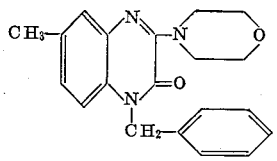

melting at 153 to 155° C.

The starting material was prepared in the following manner:

A solution of 24.2 g. of N-benzyl-2-nitro-4-methyl-aniline in 150 cc. of absolute benzene and 8 cc. of pyridine was cooled to 10° C., and a solution of 14.8 g. of dichloroacetyl chloride in 30 cc. of absolute benzene was stirred in dropwise. The mixture was stirred for 3 hours at room temperature and then allowed to stand overnight, after which water was added and the insoluble material was suctioned off, mixed with methylene chloride and sodium bicarbonate solution and exhaustively extracted by agitation. The benzene solution of the filtrate was separated from the water layer and likewise agitated with sodium bicarbonate solution. The combined methylene chloride and benzene solutions were evaporated and the residue was recrystallized from ethyl acetate+petroleum ether, to yield N-benzyl-N-dichloroacetyl-2-nitro-4-methyl-aniline melting at 159 to 160° C.

10 g. of N-benzyl-N-dichloroacetyl-2-nitro-4-methyl-aniline were stirred in small portions into a mixture of 50 cc. of morpholine and 1 g. of sulfur, and the mixture was then heated for 1 hour at 60° C., allowed to cool, mixed with water and extracted with methylene chloride. The methylene chloride solution was washed with ice-cold 2 N-hydrochloric acid and with saturated sodium bicarbonate solution, evaporated, and the residue was recrystallized from ethanol+methylene chloride+petroleum ether, to yield α-[2-nitro-4-methyl-N-benzylanilino]-α-oxoacetic acid thiomorpholide melting at 154 to 157° C.

Example 3

A solution of 3.1 g. of α-[ortho-nitranilino]-α-oxoacetic acid thio-N-methylpiperazide in 600 cc. of ethanol was hydrogenated at room temperature in the presence of 3 g. of nickel catalyst. When the calculated amount of hydrogen has been absorbed, the catalyst was suctioned off, the filtrate was evaporated to dryness under vacuum and the residue crystallized from ethanol, to yield α-[ortho-aminoanilino]-α-oxoacetic acid thio-N-methylpiperazide in yellow crystals melting at 190 to 192° C.

A solution of 3.5 g. of α-[ortho-aminoanilino]-α-oxoacetic acid thio-N-methylpiperazide in 300 cc. of ethanol was refluxed for 6 hours, then evaporated to dryness under vacuum, and the residue was crystallized from a small amount of ethyl acetate, to yield crystalline 2-hydroxy-3-(N-methyl-piperazino)-quinoxaline of the formula

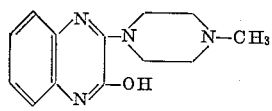

melting at 199 to 200° C.

The starting material was prepared in the following manner:

Ortho-dichloroacetylamino-nitrobenzene was reacted with sulfur and methylpiperazine as described in Example 1, to yield α-[ortho-nitranalino]-α-oxoacetic acid thio-N-methyl-piperazide in yellow crystals melting at 161 to 162° C.

Example 4

α-[2-phenyl-4-para-chlorophenylazo-pyrazolyl-3-amino]-α-oxoacetic acid thiomorpholide was hydrogenated in glacial acetic acid wih palladium as catalyst to yield α-[2-phenyl-4-aminopyrazolyl-3-amino]-α-oxoacetic acid thiomorpholide melting at 163 to 165° C.

8 g. of α-[2-phenyl-4-aminopyrazolyl-3-amino]-α-oxoacetic acid thiomorpholide were heated for 40 minutes in an oil bath at 180 to 190° C. The product, which solidifies on cooling was recrystallized from ethanol, to yield crystalline 1-phenyl-5-morpholino-6-hydroxypyrazolo-[3:4-b]pyrazine of the formula

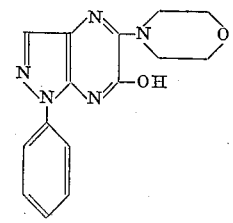

melting at 238 to 240° C.

The starting material was prepared in the following manner:

By reacting 2-phenyl-3-amino-4-para-chlorophenylazo-pyrazole with dichloroacetyl chloride, 2-phenyl-3-dichloro-acetylamino-4-para-chlorophenylazopyrazole (melting at 185 to 186° C.) was obtained which on being heated with sulfur and morpholine yielded α-[2-phenyl-4-para-chlorophenylazopyrazolyl-3-amino]-α-oxoacetic acid thiomorpholide melting at 216 to 218° C.

What is claimed is:

1. A process for the manufacture of 1:4 diazines, which comprises reducing in a cyclic compound, which carries at a ring-carbon atom a thiooxamoylamino group and at a carbon atom adjacent to the carbon atom carrying said thiooxamonylamino group a group X being a member selected from the group consisting of nitro, nitroso and azo, X into a free amino group in the absence of acids and bases and intramolecularly condensing the resulting compound in the absence of acids and bases.

2. A process as claimed in claim 1, wherein the ring closure is effected by heating.

3. A process as claimed in claim 1, wherein the cyclic portion of said cyclic compound is an alicyclic group.

4. A process as claimed in claim 1 wherein the cyclic portion of said cyclic compound is an aromatic group.

5. A process as claimed in claim 1, wherein the cyclic portion of said cyclic compound is a heterocyclic group which is linked to the nitrogen atom through a cyclic carbon atom which is in vicinal position to a further cyclic carbon atom.

6. A process as claimed in claim 1, wherein the cyclic portion of said cyclic compound is a cycloalkyl group.

7. A process as claimed in claim 4, wherein the aromatic group is an at most binuclear aromatic group.

8. A process as claimed in claim 4, wherein the aromatic group is a phenyl group.

9. A process as claimed in claim 5, wherein the heterocyclic group is a member selected from the group consisting of a pyrimidyl-4 and pyrimidyl-5 group.

10. A process as claimed in claim 5, wherein the heterocyclic group is a member selected from the group consisting of a pyridyl-2 and pyridyl-3-group.

11. A process as claimed in claim 5, wherein the heterocyclic group is a member selected from the group consisting of a pyrazolyl-3 and pyrazolyl-4 group.

12. A process as claimed in claim 5, wherein the heterocyclic group is a member selected from the group consisting of a pyridazyl-3 and pyridazyl-4 group.

13. A process as claimed in claim 1, wherein the amino group is disubstituted by alkyl groups.

14. A process as claimed in claim 1, wherein the amino group is disubstituted by alkylene groups in which the alkylene chains are interrupted by a hetero atom selected from the group consisting of oxygen and nitrogen.

15. A process as claimed in claim 1, wherein a member selected from the group consisting of an α-[ortho-B-anilino]-α-oxoacetic acid thioamide and an α-[5-B-pyrimidyl-4-amino]-α-oxoacetic acid thioamide is used as starting material, B being a member selected from the group consisting of nitro, nitroso and azo.

16. A process as claimed in claim 15, wherein the thioamide grouping in the starting material is tertiary.

17. A process as claimed in claim 16, wherein a member selected from the group consisting of a corresponding morpholide, piperidide, pyrrolidide, N-methylpiperazide and dialkylamide is used as starting material.

18. A process as claimed in claim 1, wherein an α-[4-B-pyrazolyl-3-amino]-α-oxoacetic acid thioamide, B being a member selected from the group consisting of nitro, nitroso and azo, is used as starting material.

19. A process as claimed in claim 18, wherein the thioamide grouping in the starting material is tertiary.

20. A process as claimed in claim 19, wherein a corresponding morpholide, piperidide, pyrrolidide, N-methylpiperazide or dialkylamide is used as starting material.

21. A compound of the formula

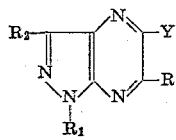

in which R represents hydroxyl, Y represents an amino group selected from the group consisting of amino, mono-lower alkylamino, di-lower alkylamino, pyrrolidino, piperidino, morpholino and piperazino and $R_1$ and $R_2$ each represents a member selected from the group consisting of lower alkyl, phenyl and phenyl-lower alkyl.

22. An acid addition salt of a compound as claimed in claim 21.

23. 1 - phenyl - 5 - morpholino-6-hydroxypyrazolo-[3:4-b] pyrazine.

24. A process for the manufacture of 1:4-diazines, which comprises reacting a cyclic compound, which carries at a ring-carbon atom a thiooxamoylamino group and at a carbon atom adjacent to the carbon atom carrying said thiooxamoylamino group an activated halogen atom with ammonia and intramolecularly condensing the resulting compound in the absence of acids and bases.

25. Process as claimed in claim 1, wherein starting materials are used in which the thiooxamoyl group is a group of the formula

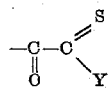

in which Y stands for tertiary amino.

26. Process as claimed in claim 24, wherein starting materials are used in which the thiooxamoyl group is a group of the formula

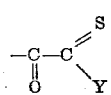

in which Y stands for tertiary amino.

27. Process as claimed in claim 1, wherein starting materials are used in which the thiooxamoylamino group is a group of the formula

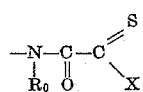

in which $R_0$ stands for a member selected from the group consisting of hydrogen and hydrocarbon and Y for tertiary amino.

28. Process as claimed in claim 24, wherein starting materials are used in which the thiooxamoylamino group is a group of the formula

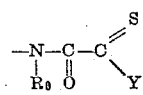

in which $R_0$ stands for a member selected from the group consisting of hydrogen and hydrocarbon and Y for tertiary amino.

29. A process as claimed in claim 25, wherein Y is an unsubstituted amino group.

30. A process as claimed in claim 25, wherein Y is an amino group disubstituted by hydrocarbon groups.

No references cited.

NICHOLAS S. RIZZO, *Primary Examiner.*

IRVING MARCUS, *Examiner.*